United States Patent
McClintock et al.

(10) Patent No.: US 9,591,023 B1
(45) Date of Patent: Mar. 7, 2017

(54) BREACH DETECTION-BASED DATA INFLATION

(71) Applicant: Amazon Technologies, Inc., Seattle, WA (US)

(72) Inventors: Jon Arron McClintock, Seattle, WA (US); George Nikolaos Stathakopoulos, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 79 days.

(21) Appl. No.: 14/537,637

(22) Filed: Nov. 10, 2014

(51) Int. Cl.
*H04L 29/06* (2006.01)
*G06F 21/60* (2013.01)

(52) U.S. Cl.
CPC .......... *H04L 63/1491* (2013.01); *G06F 21/60* (2013.01); *H04L 63/1416* (2013.01)

(58) Field of Classification Search
CPC .. H04L 63/1491; H04L 63/1416; G06F 21/60
See application file for complete search history.

(56) References Cited

U.S. PATENT DOCUMENTS

| 2003/0208694 | A1* | 11/2003 | Fang | H04L 63/02 726/12 |
| 2005/0177559 | A1* | 8/2005 | Nemoto | G06F 17/30386 |
| 2008/0052359 | A1* | 2/2008 | Golan | G06Q 10/107 709/206 |
| 2010/0122054 | A1* | 5/2010 | Mardiks | G06F 21/554 711/163 |
| 2010/0281069 | A1* | 11/2010 | Stephenson | G06F 17/30522 707/803 |

* cited by examiner

*Primary Examiner* — Robert Leung
(74) *Attorney, Agent, or Firm* — Davis Wright Tremaine LLP

(57) ABSTRACT

A method and apparatus for deterring exfiltration of data from are provided. In the method and apparatus, it is determined that data is to be inflated. A request for access to data is received and data responsive to the request is retrieved. Spurious data is also generated and provided together with the responsive data in response to the request.

20 Claims, 10 Drawing Sheets

BREACH DETECTION-BASED DATA INFLATION

BACKGROUND

Computer systems can become subject to attacks, where an unauthorized party attempts to gain access to data stored by a computer system. An attacker may seek to obtain data to be exfiltrated and used to the attacker's benefit. Attacks may target financial data, such as credit card numbers, or the attacks may be part of an industrial espionage operation, where trade secrets, design documents or specifications may be retrieved. Attacks on computer systems present challenges to operators of computer systems whereby, despite advances in data security, the attacks still occur with alarming frequency. Furthermore, these attacks, even when unsuccessful, have adverse economic impacts on individuals and organizations alike. The attacks can force organizations to suspend their operations for periods of time. In addition, attacks directed towards identity theft or the financial information of an organization's customer may be very costly to the organizations.

It is challenging to have a method for protecting data stored in a data storage system. Furthermore, it is also challenging to protect that data while ensuring uninterrupted access to the data by parties having an authorization to access the data.

BRIEF DESCRIPTION OF THE DRAWINGS

Various embodiments in accordance with the present disclosure will be described with reference to the drawings, in which.

DETAILED DESCRIPTION

Figure 1:
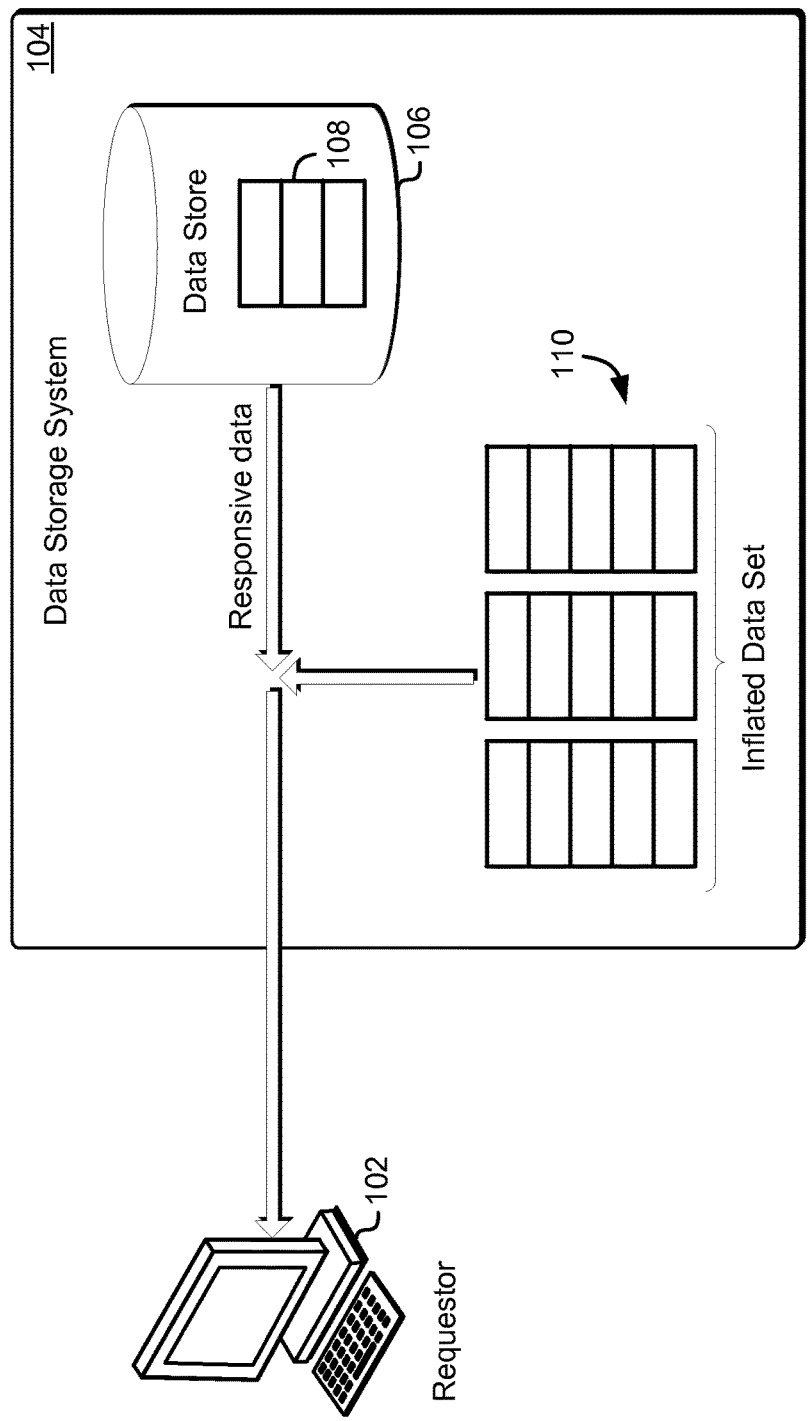
FIG. 1 shows an example of an environment for inflating data in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include protecting data stored in a data store or another type of data vending system. Access to the data may be limited to parties, such as users, who have a privilege to access the data. For example, access to the data store may be governed by an access policy that dictates an access privilege required to obtain the data or cause the data to be retrieved from the data store. The data store, which may be one or more hard drives or solid state drives, may be breached in the unlikely event that an attacker defeats security measures already in place. Due to the breach a party lacking a privilege to access the data store, such as an attacker, may be enabled to retrieve data from the data store.

In response to detecting the breach, the data retained in the data store may be inflated. Inflating the data may include increasing the size of the data by adding additional data. The additional data (also referred to herein as spurious data) may be produced or manufactured to appear genuine or authentic while at the same time being 'phony' or 'bogus'. The spurious data may be generated to have attributes of the data retained by the data store. The spurious data may have the same data type or structure (for example, schema) as that stored by the data store. For example, if the data store stores geolocation data specifying a route between two geographic points, the spurious data may be generated to represent a route between two geographic points. However, both the route and the two geographic points of the spurious data may be selected randomly or based at least in part on an algorithm for the purpose of appearing genuine. Similarly, if the data store stores credit card numbers of customers, the spurious data may have the characteristics of a credit card number, such as the number of digits and meeting a requisite validity check. However, the generated credit card number may not have been issued by a financial institution and may not be usable as a payment instrument. Because the spurious data has the same characteristics as the data retained in the data store, the spurious data may deceive an attacker and may become indistinguishable from the data the attacker seeks to obtain.

Following detecting that a data store has been breached, the spurious data may be generated. Further, if a request to access data retained by the data store is received, both data that is responsive to the request and the spurious data may be provided. The responsive data may meet one or more criteria specified in the request. However, certain attacks may seek to perform a 'data dump' and retrieve all the data retained in a data store. In addition, the size of the spurious data may be larger than the volume of the responsive data. For example, the ratio of the size of the spurious data to the size of responsive data may be over ten, one hundred or one thousand. Increasing the size of the spurious data lowers the likelihood that a randomly selected data record from the combination of responsive data and the spurious data is genuine.

The spurious data may be generated to have one or more distinguishing attributes. The attributes may be provided to parties having an authorization to access the data. The authorization may be as a result of the party having access privilege to retrieve data from the data store and may be used by the parties to filter out the spurious data. However, if access privileges are illegitimately obtained, for example, as a result of stealing access credentials, then the party using the access credentials may not be authorized to access the data. The spurious data may be generated such that the application of a hash function to the spurious data or data records thereof results in a hash value of a set of hash values. The hash function and the set of values may be provided to parties having an authorization to retrieve data from the data store and may be used to identify the spurious data and recover the responsive data. Accordingly, if the party makes a request for data access when a breach of the data store is detected and the party is provided with responsive data and the spurious data, the party may recover the responsive data.

FIG. 1 shows an example of an environment for inflating data in accordance with at least one embodiment. A data storage system 104 is shown to include a data store 106, which may be one or more storage drives, such as a hard drive or a solid state drive. The data store 106 may have a redundant array of independent disks (RAID) configuration, whereby multiple disk drives may be combined into a logical unit for data redundancy. The data storage system 104 may be part of a distributed system and may be used to store data belonging to a plurality of customers. Further, data sets stored by the data storage system 104 may comprise a plurality of data records. The data set may, for example, be a database table and a record may be a row or column of the table. A requestor 102 is shown in FIG. 1. The requestor 102 may be a computer system that communicates with the data storage system 104 by, for example, sending requests to access data stored by the data storage system 104. The requestor 102 may operate in an automated fashion and/or in connection with user input provided to an input device. The requestor 102 may be a legitimate user of the data storage system 104 and may have an authorization that grant the requestor 102 access to the data storage system 104. Furthermore, the requestor 102 may not be a legitimate user of the data storage system 104. For example, the data storage system 104 may be breached and an attacker that does not have an authorization permitting retrieval of data from the data store 106 may access the data store 106.

If breach of the data storage system 104 is detected, an inflated data set 110 is generated as described herein, whereby the inflated data set 110 may include spurious data. Furthermore, if the data storage system 104 is breached, data that is responsive to a request for access may be retrieved from the data store 106 and provided to the requestor 102 in combination with the inflated data set 110. As described herein, the combination of the inflated data set 110 and the responsive data may it difficult for an attacker to make use of the received data.

Figure 2:
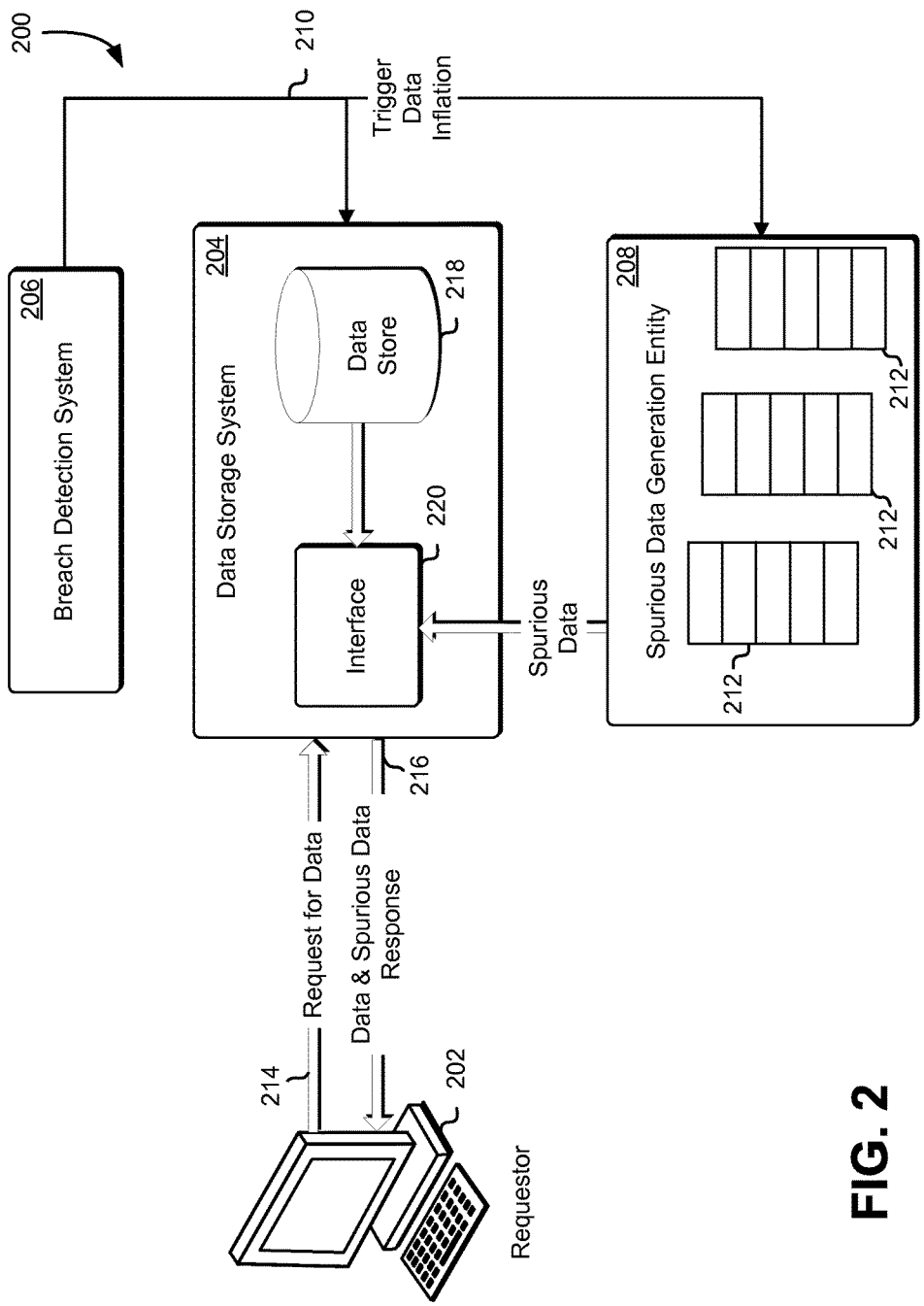
FIG. 2 shows an example of an environment for inflating data in accordance with at least one embodiment.

FIG. 2 shows an example of an environment for inflating data in accordance with at least one embodiment. In the environment 200, a requestor 202, data storage system 204, breach detection system 206 and spurious data generation entity 208 are shown. The data storage system 204 may be any type of system configured to store data or provide the data in response to a request for access to the data. The data storage system 204 may, in various embodiments, be a database or file storage system. In addition, the data storage system 204 may be any type of data vending system, whereby the data vending system may receive requests for data and provide data in response to the requests. The data vended by the data vending system may be retrieved from an associated data store or dynamically generated (for example, in response to the request), among others. Furthermore, the data storage system 204 may be remotely accessible by the requestor 202 via a network (not shown), whereby the network may be a public network, such as the Internet, or a private network, such as an intranet. The data storage system 204 may include one or more computing resources, such as storage devices, servers or networking equipment including routers. The one or more computing resources may be configured (for example, collectively) to receive requests for accessing the data from one or more entities including the requestor 202 and provide the requested data as well as spurious data in response to the request as described herein. The data storage system 204 may be a database service in a multi-tenant environment. The data storage system 204 may be used to store data pertaining to a plurality of customers and the data may be accessible to the customers who may make requests to access the data from the data storage system 204 and retrieve the data in response to the request.

The data storage system 204 may further be dedicated to store data pertaining to a single organization. The organization may be a health care provider, a retailer (such as, an ecommerce retailer), a financial services organization or a social media service provider, among many others. The data storage system 204 may store data that is sought to seized and exploited by attackers. In the unlikely event that an attacker defeats security measures already in place, the attacker may attempt to exploit the data to their benefit.

The data may include trade secrets, design documents, medical data or sales data, among others. Furthermore, if the organization maintains records about its customers, the records may be sought to be exploited. Personally identifiable information (PII) including names, contact information and government identification (ID) numbers and information about payment instruments including credit card numbers, gift card numbers or bank account information may also be subject to exploitation by attackers. In addition, the organization may provide social media services to customers or may be an ecommerce retailer. The organization may maintain browsing history, "click stream" data or purchase history of the customers, among others, and attackers may seek to obtain the data. In another example, the organization may sell media including ebooks or downloadable music, movies, television series or device applications. Attackers may attempt to obtain the organization's library of media. Furthermore, financial data including sales volumes or profits may also be exploited.

A breach detection system 206 of the environment 200 may detect that the data storage system is subject to an attack or is likely to be subject to an attack. For example, a system may be breached if a malicious user has gained access to the system, whereby the malicious user may pose as a legitimate user. The breach detection system 206 may identify the attacker, for example, by an identity used by the attacker. Alternatively, the breach detection system 206 may only identify that an attack is occurring but may not identify the source of the attack or an identity used by the attacker to gain access to the data storage system 204.

In various embodiments it may be undesirable to disable the vending of data from the data storage system in response to breach detection. Disabling the retrieval of data from the data storage system 204 may disrupt the operation of the organization. For example, an ecommerce retailer may be unable to serve its customer or its service to customers may be hindered due to disabling the retrieval of data from the data storage system 204. Furthermore, if an identity of an attacker is identified, it may be desirable not to immediately disable the attacker's access to the data storage system 204 as that would deny the opportunity to study the attacker or learn a profile of the attacker including the techniques used by the attacker to infiltrate or breach the data storage system 204. Furthermore, disabling the system may alarm or fend off the attacker which may result in losing an opportunity to track the attacker or an origin of the attacker or cause the attacker to find a more fruitful way to breach the system.

In the unlikely event that an attacker defeats security measures already in place, the breach detection system 206 detects a data breach. While actively determining how to stop the breach and terminate an attacker's access, data inflation may be performed. Upon detecting a breach, the breach detection system 206 sends an indication 210 of the breach to the data storage system 204 or the spurious data generation entity 208. The indication 210 may be an electronic message containing instructions to perform data inflation.

Receipt of the indication by the data storage system 204 or the spurious data generation entity 208 may cause the spurious data generation entity 208 to generate spurious data 212. The spurious data 212 may be provided in a response 216 to a request 214 for data by the requestor 202. The spurious data 212 may be provided together with data retrieved from a data store 218 of the data storage system 204. The retrieved data is responsive to the request 214 and providing the retrieved data in response to the request 214 may fulfill the request 214. The spurious data 212 may be used to inflate the volume of data provided in response to the request 214 and may be many times the size of data that is responsive to the request 214. The combination of the spurious data 212 and responsive data may overwhelm an attacker and render the retrieved data unusable. For example, if the ratio of responsive data to spurious data 212 is on the order of one thousand to one, it will be improbable that a randomly selected data record from the combination of the responsive data and spurious data 212 will be real.

Because the volume of the spurious data 212 is many times that of the responsive data, it may be desirable to ensure that providing the spurious data 212 does not strain the bandwidth resources or data storage resources of the data storage system 204 or associated organization. The spurious data 212 may not be pre-generated prior to receiving the request for the data 214 and may instead be generated in real-time or "on the fly" in response to receipt of the request for the data 214 or detecting a breach. Furthermore, because of the increased volume of traffic due to the spurious data 212, the spurious data 212 may be routed to an entity that is as close as possible to the requestor 202. As shown in FIG. 2, the spurious data 212 is routed to an interface 220 used to provide data to the requestor 202.

Figure 3:
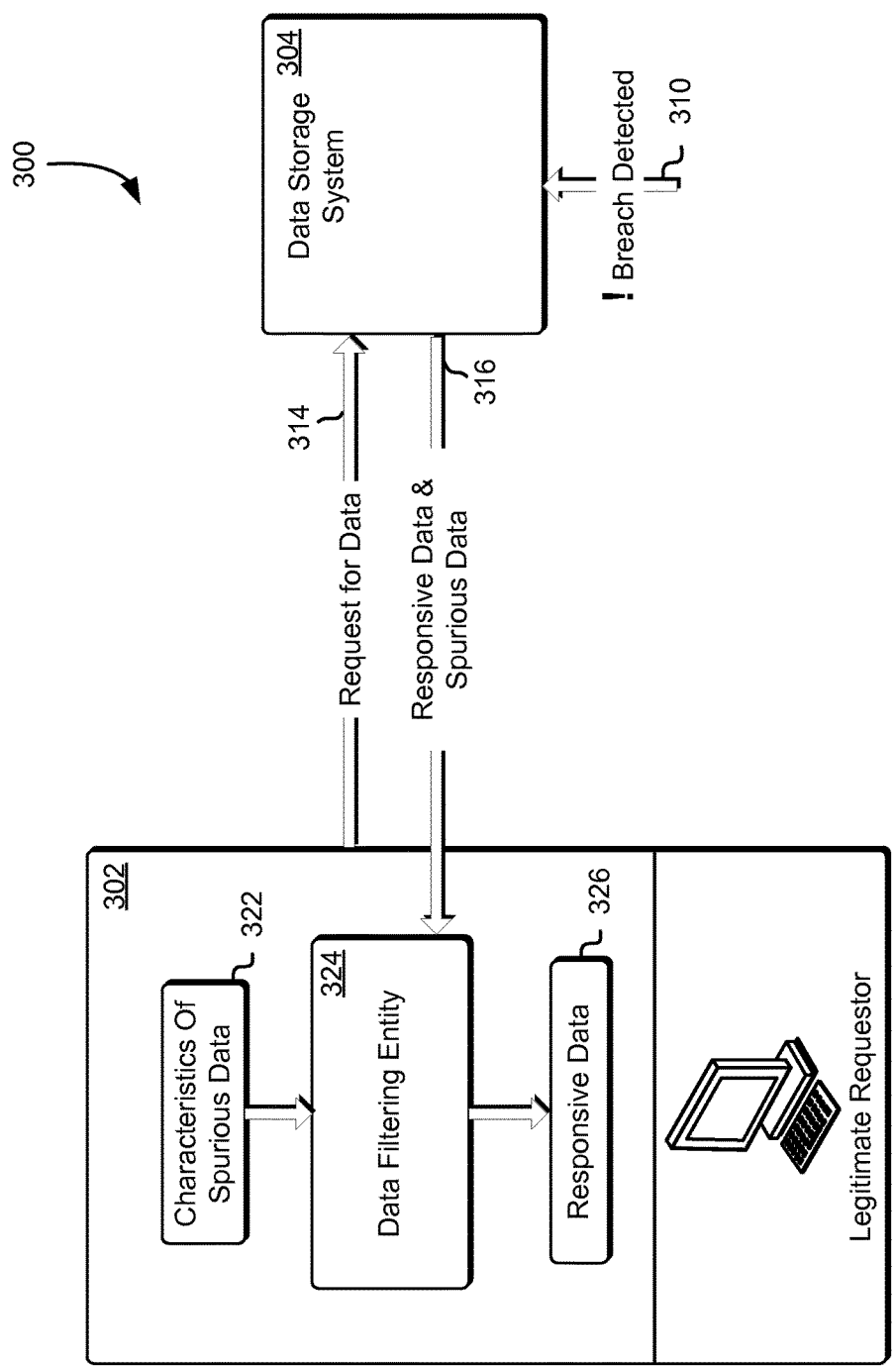
FIG. 3 shows an example of an environment for extracting responsive data by a requestor in accordance with at least on embodiment.

FIG. 3 shows an example of an environment for extracting responsive data by a requestor in accordance with at least on embodiment. In the environment 300, a requestor 302 sends a request for data 314 to a data storage system 304. A breach may have occurred in the environment 300, and the data storage system 304 may receive an indication 310 that the breach is detected. Due to the breach, a data set maintained by the data storage system 304 may be inflated, whereby forged data (referred to herein as spurious data) may be generated and provided in response to the request for the data 314. The spurious data is provided in addition to data that is responsive to the request. The data storage system 304 may provide the spurious data to all requestors due at least in part to the fact that an identity used by an attacker may not be identified.

The requestor 302 may be a legitimate requestor having an authorization to access the requested data. The requestor, as a legitimate requestor, may be configured filter out the spurious data and extract the responsive data. The requestor 302 may retain characteristics 322 of the spurious data. The characteristics 322 may include a hash value of the spurious data, whereby the hash value may be expected to be obtained as a result of applying a hash function to the spurious data. Further, the characteristics 322 may include a signature associated with the spurious data. A data filtering entity 324 of the requestor 302 may utilize the characteristics 322 to identify the spurious data. The data filtering entity 324 may be an application that runs on the underlying computing resources of the requestor 302. The computing resources may include computational resources, such as those provided by a central processing unit (CPU) of the requestor 302. The data filtering entity 324 may evaluate received data including spurious data and responsive data. The evaluation may include applying a hash function to data records and evaluating a resultant hash value to determine whether it corresponds (for example, matches) the characteristics 322 of the spurious data. If a record is found to correspond to the characteristics 322, the record may be discarded. Data that is not found to correspond to the characteristics 322 may be determined to be responsive 326 to the request 314 and may, therefore, be retained and used by the requestor 302.

An illegitimate requestor, such as an attacker lacking requisite authorization for accessing the data storage system may not have access to the characteristics 322 of the spurious data. Accordingly, the illegitimate requestor may not be configured to distinguish between the responsive data and the spurious data. Because the ratio of spurious data to responsive data may be high (for example, in the tens, hundreds or thousands), the probability of a randomly selected data record being responsive may be low. Accordingly, without distinguishing or discriminating between the responsive data and the spurious data, the received data may be unusable by a party lacking access to the characteristics of the spurious data 322.

It is noted that characteristics of the responsive data may also be used to filter out the spurious data. The characteristics may include the location or placement of the responsive data in a combination of the spurious data and the responsive data. For example, if a plurality of data records are provided in response to a request, the data records may be ordered such that the responsive data has a specific placement, order or location. Information about the ordering of the data may be communicated to legitimate users and used to filter the spurious data. The spurious data may be customized depending on the identity of the attacker. For example, the attacker may be profiled and the generation of the spurious data maybe dependent on the identity of the attacker. Furthermore, watermarks, active content or other identifying information may be placed in the spurious data to enable tracking of attacker.

Figure 4:
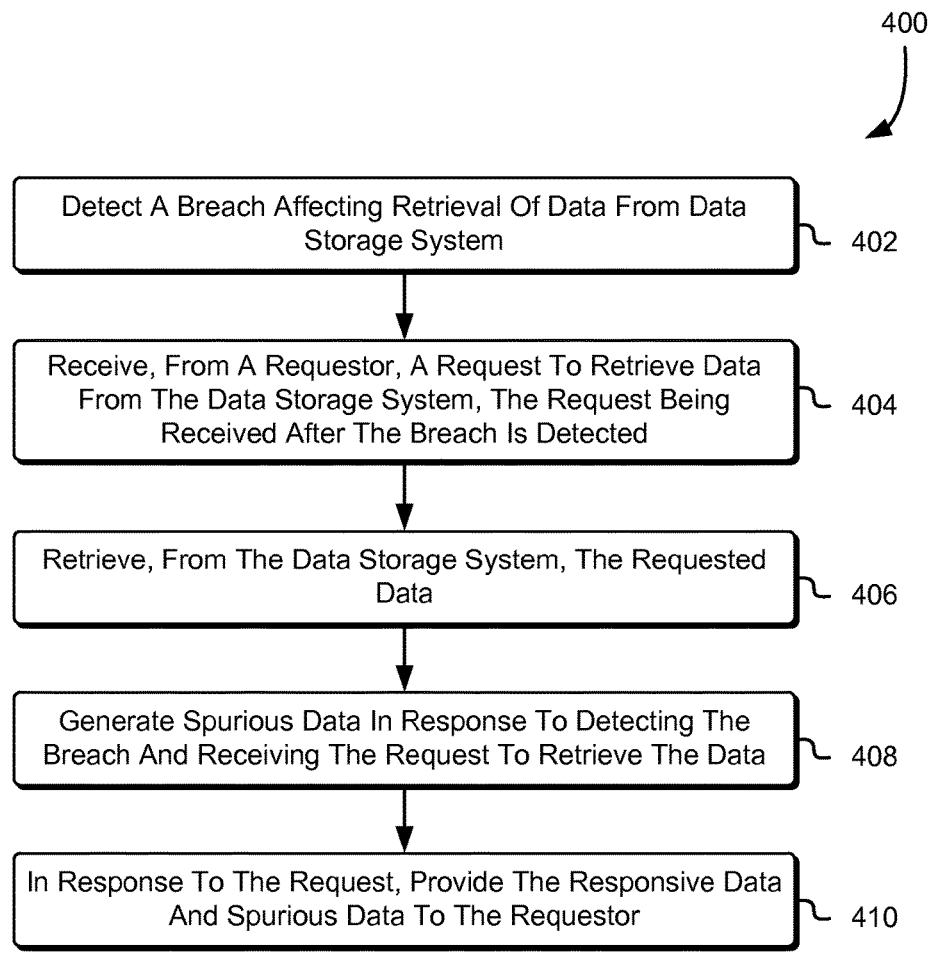
FIG. 4 shows an example of a method for responding to breach detection in accordance with at least one embodiment.

FIG. 4 shows an example of a method for responding to breach detection in accordance with at least one embodiment. In the process 400, an entity, such as the breach detection system 206 described with reference to FIG. 2, detects 402 a breach affecting retrieval of data from a data storage system, such as the data storage system 204 described with reference to FIG. 2. The breach may be detected due to an unauthorized user (such as a hacker) gaining access to the data storage system. An identity used by the attacker may be known or identified by the breach detection system or the attacker may be anonymous. In response to detecting the breach, the breach detection system may provide an indication of the detected breach to the data storage system or a spurious data generation entity such the spurious data generation entity described with reference to numeral '208' in FIG. 2.

The data storage system then receives 404, from a requestor, a request to retrieve data from the data storage system. The request to retrieve the data may be received following breach detection. The request may be a database query, among others, and may identify the data sought to be retrieved or specify one or more criteria for the requested. The request may be fulfilled by providing one or more data records that are identified by the request or that meet the one or more criteria. In addition, the request may be an application programming interface (API) function call made to the data storage system or an interface thereof, such as the interface 220 described with reference to FIG. 2. It is noted that in various embodiments, the requested data may be dynamically generated and may not be stored in a data store. Furthermore, the request for data may be any type of query, such as a database query, and data that is responsive to the request may meet criteria specified in the query. The data storage system retrieves 406, from the data storage system, the requested data. Depending on the request, the data may be a single data entry, such as a database table entry, or a plurality of entries, such as the entire database. For example, the request for data may be a request to retrieve the names and address associated with customer accounts for an organization or only accounts of customers that meet certain criteria.

The spurious data generation entity then generates 408 spurious data in response to detecting the breach and receiving the request to retrieve the data. The spurious data may preferably be fictitious yet imitative of the requested and likely to be perceived as genuine (for example, by an attacker). The data storage system then provides 410 the responsive data and spurious data to the requestor. Combining the responsive data and spurious data together may render the provided data unusable by an attacker. For example, if the ratio of spurious data to responsive data that is payment instruments is one thousand to one, it may become impractical for the attacker to use the received data as a large amount of trial an error would be required to identify the responsive or genuine data. Furthermore, it increases the likelihood of exposing the attacker due to the attempt.

If an attacker's purpose is data theft, the spurious data may be produced and formatted to appear genuine. Generating the spurious data may depend on the type or structure of the requested data. For example, if the requested data is names of individuals, publicly available databases including the popularity associated with first names and last names in geographic regions may be consulted. The spurious data may be generated by selecting first names and last names from the database and pairing the names (for example, randomly) to form an individual's names. The selection of the names may be biased based at least in part on the popularity of the name within a region such that more popular names are more likely to be selected than less popular names. Similarly, if the requested data are street or mailing addresses, publicly available databases including street names and building numbers may be used to form an authentic-looking address. The address may then be pairs with an appropriate city and zip code to form the address. In addition, fictitious email addresses may also be generated.

Furthermore, if the requested data is a government ID number or a payment instrument number (such as a credit card number or a gift card code), the numbers or codes may be randomly generated. The fabricated numbers or codes may filtered to ensure that they pass an appropriate validity check (such as the Luhn check for credit card numbers) to ensure that they are not easily filtered by an attacker. It is noted that even if a randomly generated credit card number passes the Luhn check, the credit card number may still not be valid. Even if the number is valid, the credit card number may not be used as a payment instrument unless other criteria are satisfied. The other criteria may include a proper expiration data or associated zip code, which if also randomly generated are highly improbable to make the credit card number valid as a payment instrument.

If the data sought to be imitated is behavioral data, such as browse or purchase history, a recommendations engine may be used to generate the spurious data. The recommendations engine may be seeded with a randomly selected data point, such as a popular webpage address or a popularly purchased item, to generate the forged behavioral data. Furthermore, if the data is medical data including standardized codes for diagnoses and procedures, the codes may be generated randomly or using a training algorithm.

Fabricated text data, such as that generated for specifications, design documents or books, may be generated by training a Markov chain using the genuine text. Generation using a Markov chain is advantageous in that the size of the generated text will likely be much greater than the genuine text. Furthermore, forgeries of digital content, such as audio or video files, may be randomly generated. In addition, geolocation data may be generated to appear plausible. For example, routes to popular destinations, such as restaurants, store, arenas or museums, in the vicinity of a fictitious address may be generated. The geolocation data associated with an address may be generated based at least in part on seeding the fictitious address to a generation algorithm in order to give the geolocation data an authentic appearance.

Figure 5:
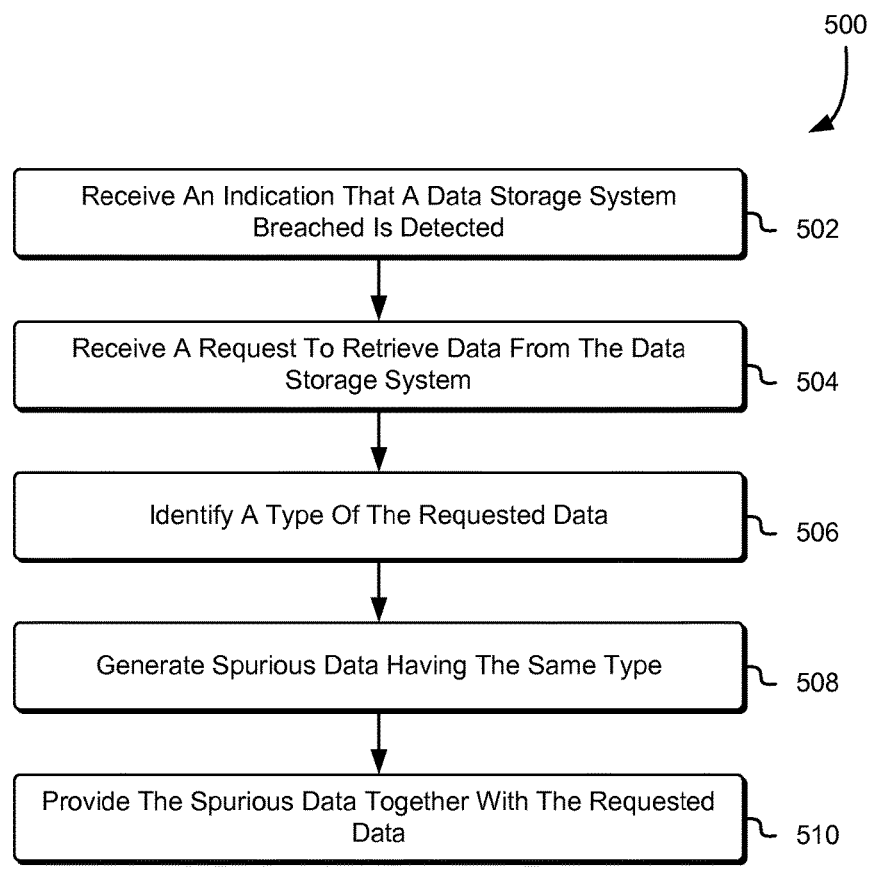
FIG. 5 shows an example of a method for spurious data generation in accordance with at least one embodiment.

FIG. 5 shows an example of a method for spurious data generation in accordance with at least one embodiment. In the process 500, a data storage system, such as the data storage system 204 described with reference to FIG. 2, receives 502 an indication that a data storage system breached is detected. The indication may be received from a breach detection system, such as the breach detection system 206 described with reference to FIG. 2. An identity used by a breaching entity, such as an attacker, may be provided if the identity is determined or the indication may be provided without the identity, for example, if the identity is not determined. The data storage system then receives 504 a request to retrieve data from the data storage system. The request may be received subsequent to receipt of the indication.

The data storage system identifies 506 a type of the requested data. The type may be a category of the data. As described herein, the requested data may be a name, an address, an identity number, a payment instrument code or a media file, among others. A spurious data generation entity, such as the spurious data generation entity 208 described with reference to FIG. 2, generates 508 spurious data having the same type. As described herein, the generation may be performed in a manner such that the spurious data may be perceived as being authentic. Following generating the spurious data, the data storage system or another entity provides 510 the spurious data together with the requested data to the requestor. It is noted that whereas some systems limit the size of data that is provided when a set of security measures protecting data is breached or limit access to the data, the techniques described herein increase the size of the data that is provided. The size of the data that is provided (or the number of data entries thereof) is increased due to the addition of the spurious data (or data entries thereof). Whereas limiting access to data in response to a breach protects the data from access by authorized and unauthorized parties alike, increasing the size of the data makes it unlikely that an unauthorized party is able to identify and select responsive non-spurious data from a combination of responsive and spurious data.

Figure 6:
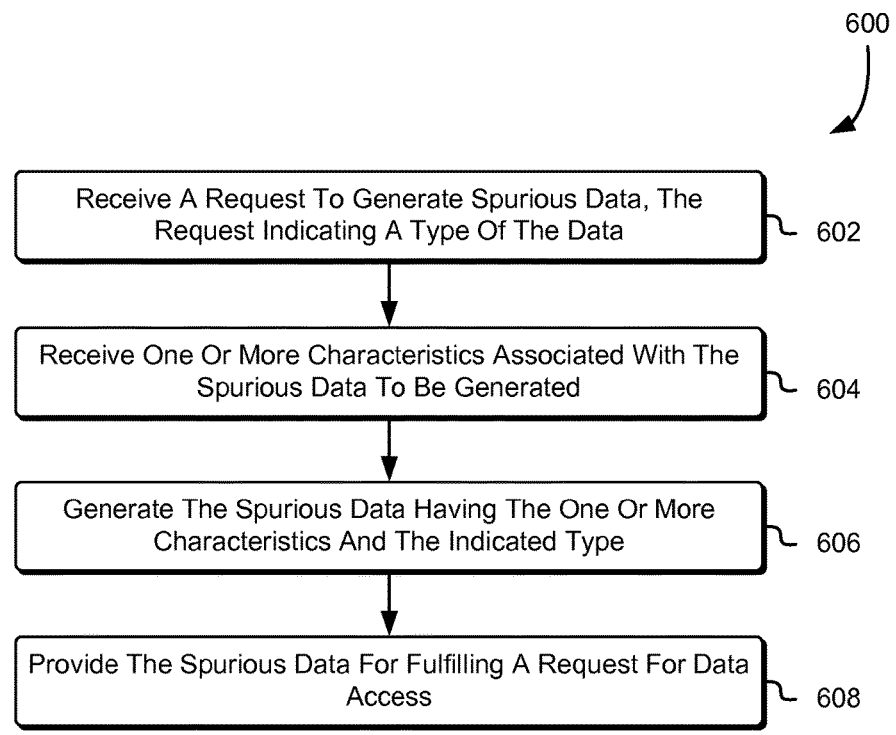
FIG. 6 shows an example of a method for spurious data generation in accordance with at least one embodiment.

FIG. 6 shows an example of a method for spurious data generation in accordance with at least one embodiment. In the process 600, a spurious data generation entity, such as the spurious data generation entity 208 described with reference to FIG. 2, receives a request to generate spurious data, whereby the request indicating a type of the data. Furthermore, the spurious data generation entity receives 604 one or more characteristics associated with the spurious data to be generated. The characteristics may be covert or overt characteristics. A covert characteristic may be a hash value of the spurious data, such as a signature, checksum or cyclic redundancy check (CRC) feature. Conversely, an overt characteristic may be an explicit indicator provided with the data, such as an additional column of a database table, among others. The characteristics may also be implicit characteristics that are inherent in the data that indicates that the data is spurious. For example, an implicit characteristic may be a mismatch between an address and a zip code.

The spurious data generation entity generates 606 the spurious data having the one or more characteristics and the indicated type. The spurious data generation entity then provides 608 the spurious data for fulfilling a request for data access. The one or more characteristics may be used by a requestor to filter out the spurious data. For example, a legitimate requestor that makes a request for data when a system breach is detected may receive both the requested data as well as the spurious data in response to the request. The legitimate requestor may be provided with the one or more characteristics and may use the characteristics to distinguish between the spurious data and the requested data. For example, the requestor may ignore or discard received data that has the one or more characteristics. The generation of the spurious data may be performed using a template for the data that specifies structured records of data entries. Entries for a data record may be generated and a data record may constructed as specified in the template. It is noted that spurious data may be generated in response to either detection of a breach or receipt of a request to access the data. When the spurious data is generated in response to breach detection, the spurious data may be stored and used when responding to a request for data access. Furthermore, the spurious data may be pre-generated prior to detecting a breach and may be stored for use in the event of breach detection.

Figure 7:
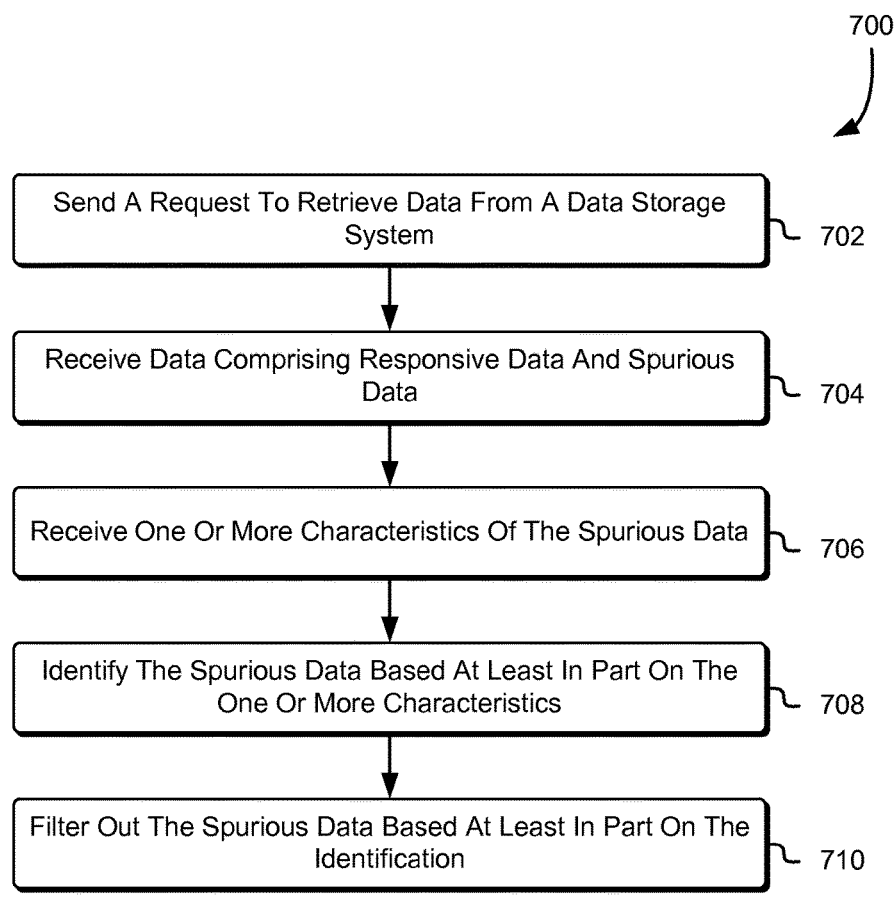
FIG. 7 shows an example of a method for filtering retrieved data based at least in part on characteristics of the data in accordance with at least one embodiment.

FIG. 7 shows an example of a method for filtering retrieved data based at least in part on characteristics of the data in accordance with at least one embodiment. In the process 700, a requestor, such as the requestor described with reference to numeral '202' in FIG. 2, sends 702 a request to retrieve data from a data storage system. The request may be an application programming interface (API) function call, among others. The requestor receives 704 data comprising responsive data and spurious data in response to the request. The requestor also receives 706 one or more characteristics of the spurious data, whereby a characteristic may be a signature of the data or a hash value that is to be generated is expected to be obtained as a result of application of a hash function to the data. A characteristic may also be an overt value of a data record, such as a column or row value.

The requestor identifies 708 the spurious data based at least in part on the one or more characteristics. For example, the requestor or another entity may apply a specified hash function to various records of the received data. The spurious data may be identified as having a specified hash value. Data that is responsive to the request (for example, that is retrieved from a data store and that is not provided as a result of data inflation) may not have the one or more characteristics. It is noted false positives may occur, whereby responsive data is discarded because it meets the one or more characteristics. The requestor then filters out 710 the spurious data based at least in part on the identification.

Figure 8:
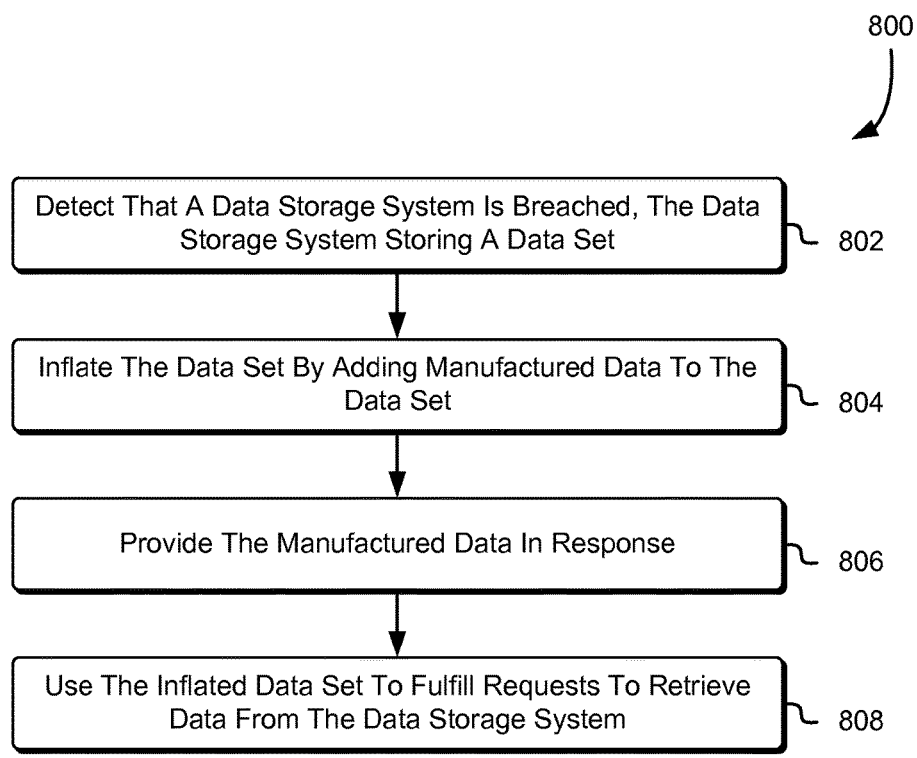
FIG. 8 shows an example of a method for deterring an attack on stored data in accordance with at least on embodiment.

FIG. 8 shows an example of a method for mitigating an attack on stored data in accordance with at least on embodiment. In the process 800, a breach detection system, such as the breach detection system 206 described with reference to FIG. 2, detects 802 that a data storage system is breached. Examples of the data storage system include the data storage system 204 described with reference to FIG. 2. The data storage system may be used to store a data set comprising a plurality of entries and the data set may be retrievable from the data storage system by making a request to the data storage system.

Following detection of the breach, the data set stored by the data storage system is inflated 806. Inflating the data set may include increasing the size of the data set by adding manufactured, forged or fake data to the data set. The proportion of the size of spurious data to the size of the data stored in the data storage system may be a function of the type or characteristics of the stored data. For example, payment information data may be inflated by a factor of one thousand to one, whereas phone number information may be inflated by a factor of one hundred to one. Further, as described herein, various data generation algorithms may be used to generate the spurious data, which may depend on the type of the spurious data. The data storage system then uses 808 the inflated data set to fulfill requests to retrieve data from the data storage system. As described herein, data that is responsive to a request to access the data set and retrieved from the data storage system may be combined with the manufactured data to fulfill requests for access to the data storage system. Furthermore, legitimate users may be provided with characteristics of the spurious data or the responsive data. The characteristics may be used to filter out the spurious data and retrieve the responsive data from the combination.

Figure 9:
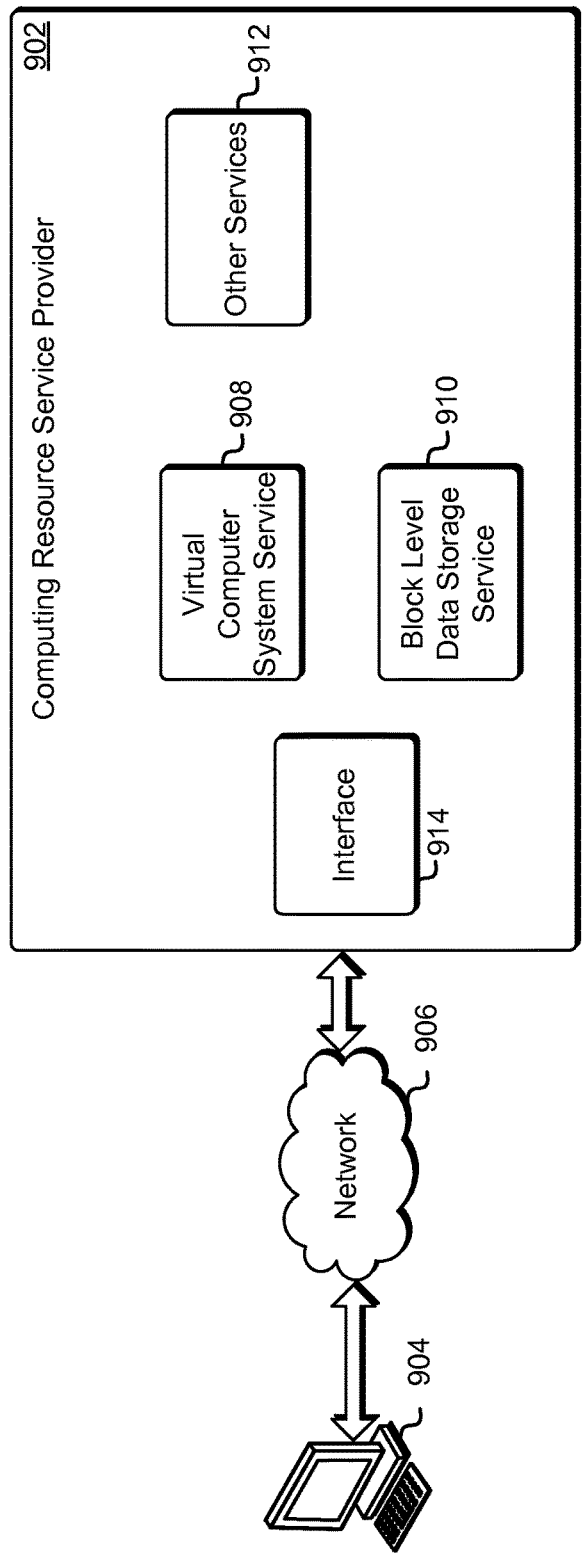
FIG. 9 shows an example of a customer connected to a computing resource service provider in accordance with at least one embodiment.

FIG. 9 shows an example of a customer connected to a computing resource service provider in accordance with at least one embodiment. The computing resource service provider 902 may provide a variety of services to the customer 904 and the customer 904 may communicate with the computing resource service provider 902 via an interface 914, which may be a web services interface or any other type of customer interface. While FIG. 9 shows one interface 914 for the services of the computing resource service provider 902, each service may have its own interface and, generally, subsets of the services may have corresponding interfaces in addition to or as an alternative to the interface 914. The customer 904 may be an organization that may utilize one or more of the services provided by the computing resource service provider 902 to maintain and deliver information to its employees, which may be located in various geographical locations. Additionally, the customer 904 may be an individual that utilizes the services of the computing resource service provider 902 to deliver content to a working group located remotely. As shown in FIG. 9, the customer 904 may communicate with the computing resource service provider 902 through a network 906, whereby the network 906 may be a communication network, such as the Internet, an intranet or an Internet service provider (ISP) network. Some communications from the customer 904 to the computing resource service provider 902 may cause the computing resource service provider 902 to operate in accordance with one or more embodiments described herein or a variation thereof.

The computing resource service provider 902 may provide various computing resource services to its customers. The services provided by the computing resource service provider 902, in this example, include a virtual computer system service 908, a block-level data storage service 910 and one or more other services 912. It is noted that not all embodiments described herein include the services 908-912 described with reference to FIG. 9 and additional services may be provided in addition to or as an alternative to services explicitly described herein. As described herein, each of the services 908-912 may include one or more web service interfaces that enable the customer 904 to submit appropriately configured API calls to the various services through web service requests. In addition, each of the services may include one or more service interfaces that enable the services to access each other (e.g., to enable a virtual computer system of the virtual computer system service 908 to store data in or retrieve data from one or more block-level data storage devices provided by the block level data storage service 910).

The virtual computer system service 908 may be a collection of computing resources configured to instantiate virtual machine instances on behalf of the customer 904. The customer 904 may interact with the virtual computer system service 908 (via appropriately configured and authenticated API calls) to provision and operate virtual computer systems that are instantiated on physical computing devices hosted and operated by the computing resource service provider 902. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications. Although the virtual computer system service 908 is shown in FIG. 9, any other computer system or computer system service may be utilized in the computing resource service provider 902, such as a computer system or computer system service that does not employ virtualization or instantiation and instead provisions computing resources on dedicated or shared computers/servers and/or other physical devices.

The computing resource service provider 902 may detect that the computing resource service provider 902 or associated services 908-912 are breached. For example, an attacker may have access to databases or data stores of the computing resource service provider 902. In response to detecting the breach, the computing resource service provider 902 may cause its data stores to be inflated. For example, if an attacker queries the identities or other information about the virtual computer systems instantiated by the virtual computer system service 908, an inflated response to the query may be provided such that the attacker may not be able to discern genuine query results from forged query results. Furthermore, to prevent the inflated data set from overwhelming the computing resource service provider 902 or associated computing entities, the query responses may not be trafficked throughout the computing resource service provider 902 and instead may be provided using a closest endpoint to the attacker. For example, the closest endpoint may be the interface 914.

The block-level data storage service 910 may comprise one or more computing resources that collectively operate to store data for a customer 904 using block-level storage devices (and/or virtualizations thereof). The block-level storage devices of the block-level data storage service 910 may, for instance, be operationally attached to virtual computer systems provided by the virtual computer system service 908 to serve as logical units (e.g., virtual drives) for the computer systems. A block-level storage device may enable the persistent storage of data used/generated by a corresponding virtual computer system where the virtual computer system service 908 may only provide ephemeral data storage. Data inflation for the block-level data storage service 910 may be enabled in response to detecting a breach of the block-level data storage service 910 or the computing resource service provider 902.

The computing resource service provider 902 additionally maintains one or more other services 912 based at least in part on the needs of its customers 904. For instance, the computing resource service provider 902 may maintain a database service for its customers 904. A database service may be a collection of computing resources that collectively operate to run one or more databases for one or more customers 904. The customer 904 may operate and manage a database from the database service by utilizing appropriately configured API calls. This, in turn, may allow a customer 904 to maintain and potentially scale the operations in the database. Other services include, but are not limited to, object-level archival data storage services, services that manage and/or monitor other services.

Figure 10:
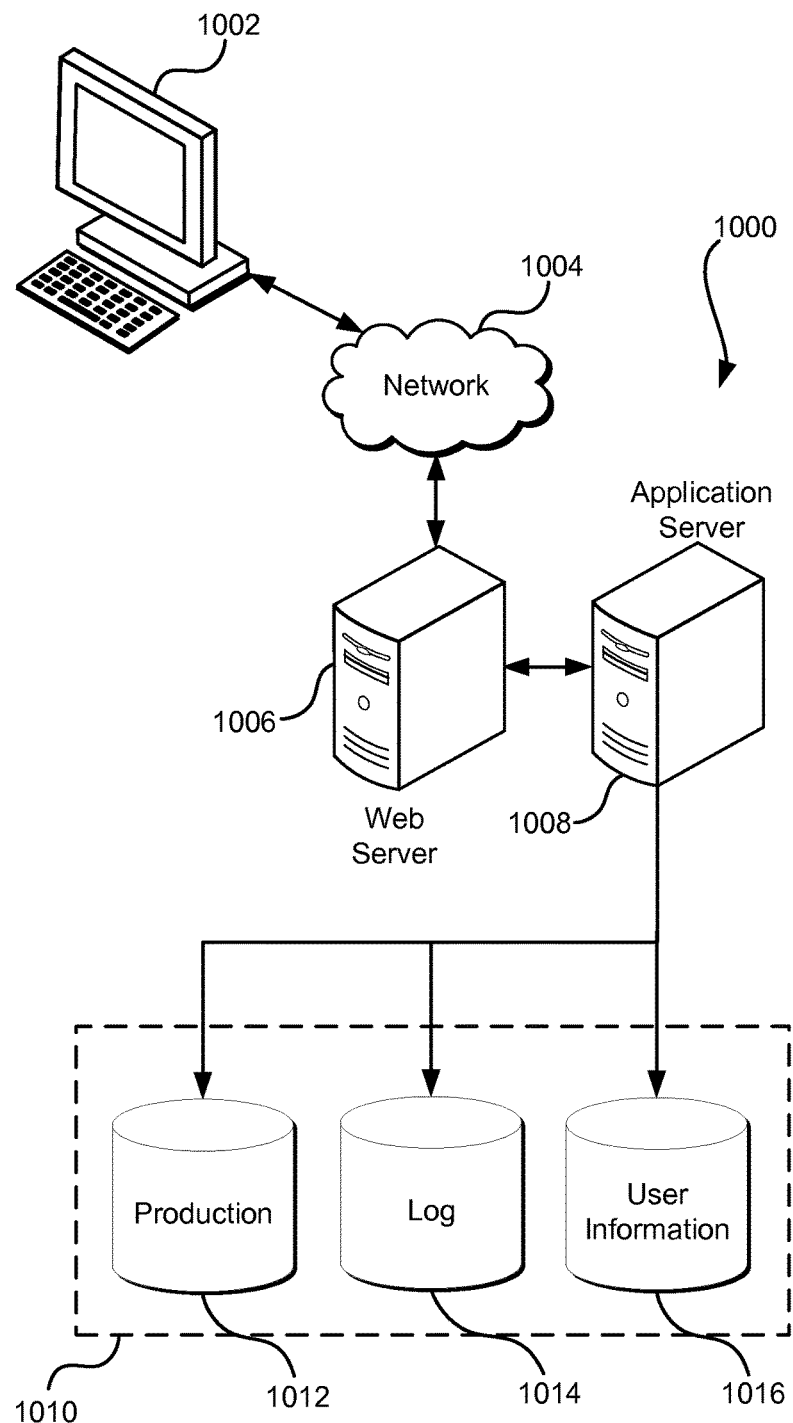
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
under the control of one or more computer systems configured with executable instructions,
detecting a breach of a set of security measures protecting data, the breach resulting in retrieval of the data by a party lacking an authorization to retrieve the data;
receiving a request for the data;
retrieving, in response to the request, the data; and
as a result of the breach:
obtaining spurious data, the spurious data having a same type and structure as the data, an amount of the spurious data being larger in size than an amount of the data; and
providing both the data and the spurious data in response to the request to retrieve the data.

2. The computer-implemented method of claim 1, wherein:
the spurious data comprises a plurality of data entries;
an individual data entry of the plurality of data entries is generated to have a signature of a set of characteristics; and
the method further comprises providing the set of characteristics to a party having an authorization to retrieve the data.

3. The computer-implemented method of claim 2, wherein the set of characteristics are used for filtering out the spurious data from a combination of the data and the spurious data.

4. The computer-implemented method of claim 1, wherein:
detecting the breach of the set of security measures further includes determining an identity associated with a party illegitimately accessing a data store; and
the spurious data is provided in response to the request to retrieve the data on a condition that the request to retrieve the data originated from a party having the identity.

5. A system, comprising:
one or more processors; and
memory including instructions that, as a result of being executed by the one or more processors, cause the system to:
determine, in response to a breach of a data vending service, that data returned by the data vending service is to be inflated;
receive, by the data vending service, a request for the data;
obtain a data set responsive to the request for the data; and
as a result of the breach:
increase an amount of the data included in the data set by adding spurious data to the data set; and
provide the data set having the spurious data and the data in response to the request.

6. The system of claim 5, wherein:
the spurious data has one or more characteristics; and
the data is obtained, by a receiving party, from the data set based at least in part on the one or more characteristics.

7. The system of claim 6, wherein the one or more characteristics include a hash value resulting from application of a hash function to at least a portion of the spurious data.

8. The system of claim 6, wherein the instructions further cause the system to provide the one or more characteristics of the spurious data to a party having an authorization to access the data vending service.

9. The system of claim 5, wherein:
the data has a data type; and
the spurious data is generated to be of the same data type as the data.

10. The system of claim 9, wherein the data type is a name, address, payment instrument code, media file or behavioral data.

11. The system of claim 10, wherein:
on a condition that the data type is a name, the spurious data is generated by selecting a name from a name database; and
the selecting is performed such that a probability of selecting the name is a function of a frequency of occurrence of the name in a population.

12. The system of claim 5, wherein a size of the spurious data is larger than a size of the data set responsive to the request for the data.

13. A non-transitory computer-readable storage medium having stored thereon executable instructions that, when executed by one or more processors of a computer system, cause the computer system to at least:
　store one or more characteristics of records of spurious data;
　cause a request for data to be sent;
　responsive to the request, receive a plurality of data records comprising at least one responsive data record and at least one spurious data record, the at least one responsive data record being responsive to the request for data and the at least one spurious data record being provided as a result of a set of security measures protecting data being breached;
　identify the at least one spurious data record of the plurality of data records based at least in part on the one or more characteristics; and
　obtain the at least one responsive data from the plurality of data records based at least in part on identifying the at least one spurious data record.

14. The non-transitory computer-readable storage medium of claim 13, wherein the instructions further comprise instructions that, when executed by the one or more processors, cause the computer system to discard the at least one spurious data record after identifying the at least one spurious data record.

15. The non-transitory computer-readable storage medium of claim 13, wherein the one or more characteristics include a field value of the at least one spurious data record.

16. The non-transitory computer-readable storage medium of claim 13, wherein the one or more characteristics include a hash value resulting from an application of a hash function to the at least one spurious data record.

17. The non-transitory computer-readable storage medium of claim 13, wherein the instructions further comprise instructions that, when executed by the one or more processors, cause the computer system to receive the one or more characteristics in response to demonstrating possession of an access privilege to the data.

18. The non-transitory computer-readable storage medium of claim 13, wherein a ratio of a size of the at least one spurious data record to a size of the at least one responsive data record exceeds ten.

19. The non-transitory computer-readable storage medium of claim 13, wherein:
　the at least one responsive data record is payment instrument data that meets a validity check; and
　the at least one spurious data record meets the validity check.

20. The non-transitory computer-readable storage medium of claim 13, wherein:
　the instructions further comprise instructions that, when executed by the one or more processors, cause the computer system to:
　　cause a second request to retrieve data to be sent; and
　　receive a second data portion in response to the second request to retrieve data; and
　the second data portion lacking a spurious data record as a result of a breach of the set of security measures not being detected.

* * * * *